United States Patent

Mayo

[15] 3,690,266
[45] Sept. 12, 1972

[54] RAIL SUSPENSION ARRANGEMENT

[72] Inventor: Alfred M. Mayo, 14604 Las Flores, Dallas, Tex. 75240

[22] Filed: June 2, 1970

[21] Appl. No.: 42,781

[52] U.S. Cl. .................104/123, 104/89, 104/124, 104/125
[51] Int. Cl. ....................E01b 25/22, E01b 25/24
[58] Field of Search..........267/178, 79, 74, 174, 166; 104/89, 122–126, 112, 115–117

[56] References Cited

UNITED STATES PATENTS

| | | | |
|---|---|---|---|
| 3,244,113 | 4/1966 | Smysek | 104/126 |
| 976,463 | 11/1910 | Horner | 104/116 |
| 3,541,964 | 11/1970 | Harbert | 104/123 |
| 715,647 | 12/1902 | Dunnegan | 267/74 |
| 206,385 | 7/1878 | Post | 104/124 |
| 3,462,137 | 8/1969 | Grube | 267/74 |
| 694,359 | 3/1902 | Farr | 104/124 |
| 453,939 | 6/1891 | Randall | 104/123 |

Primary Examiner—Gerald M. Forlenza
Assistant Examiner—D. W. Keen
Attorney—Olson, Trexler, Wolters & Bushnell

[57] ABSTRACT

An overhead monorail guideway arrangement for transportation vehicles comprises a suitable number of upright columns arranged in spaced relationship along a transportation route, an overhead rail, and a suspension which resiliently mounts the rail to the columns, the resilient mounting minimizing differential vertical deflection of the rail under live loading so as to provide substantially level transit to a vehicle riding on the rail.

7 Claims, 7 Drawing Figures

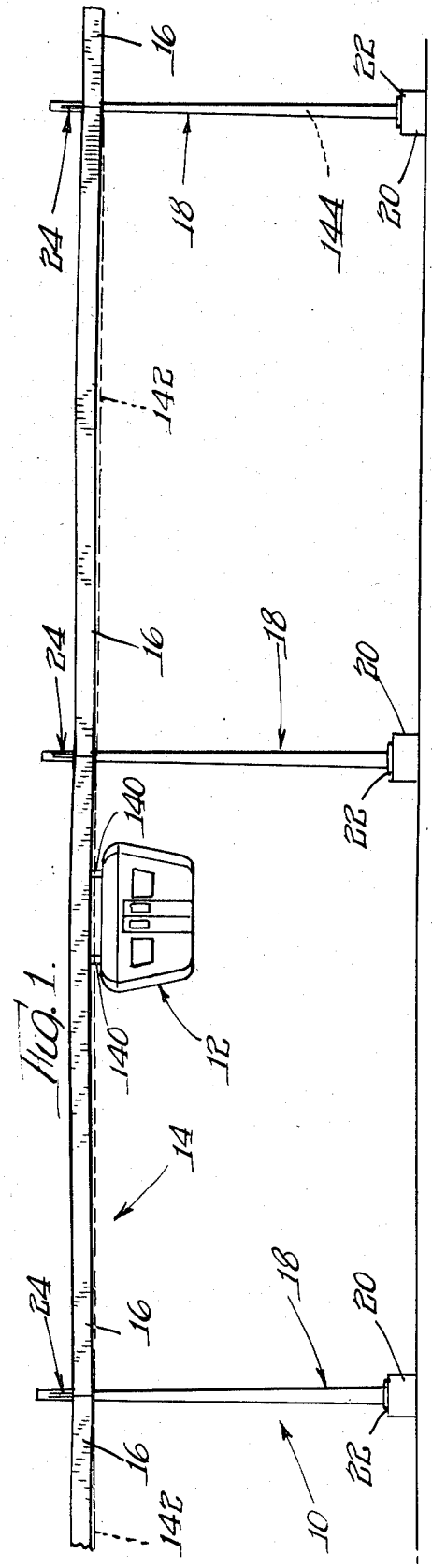
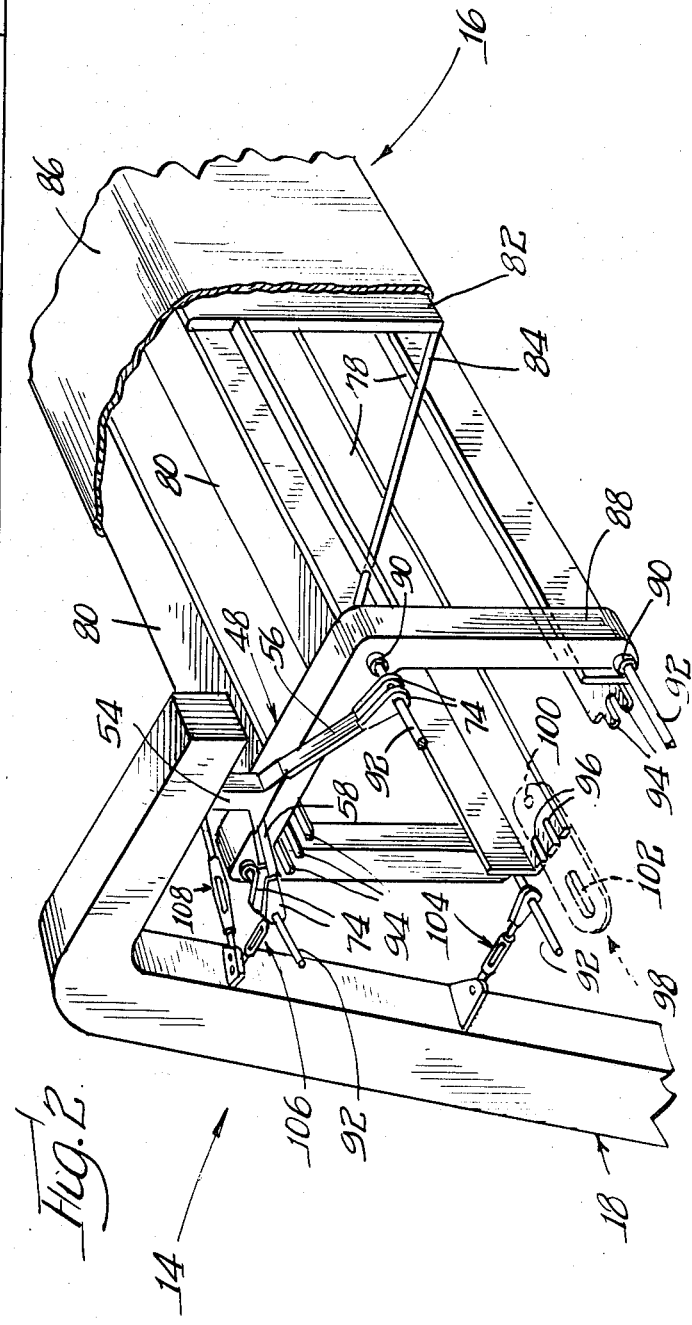

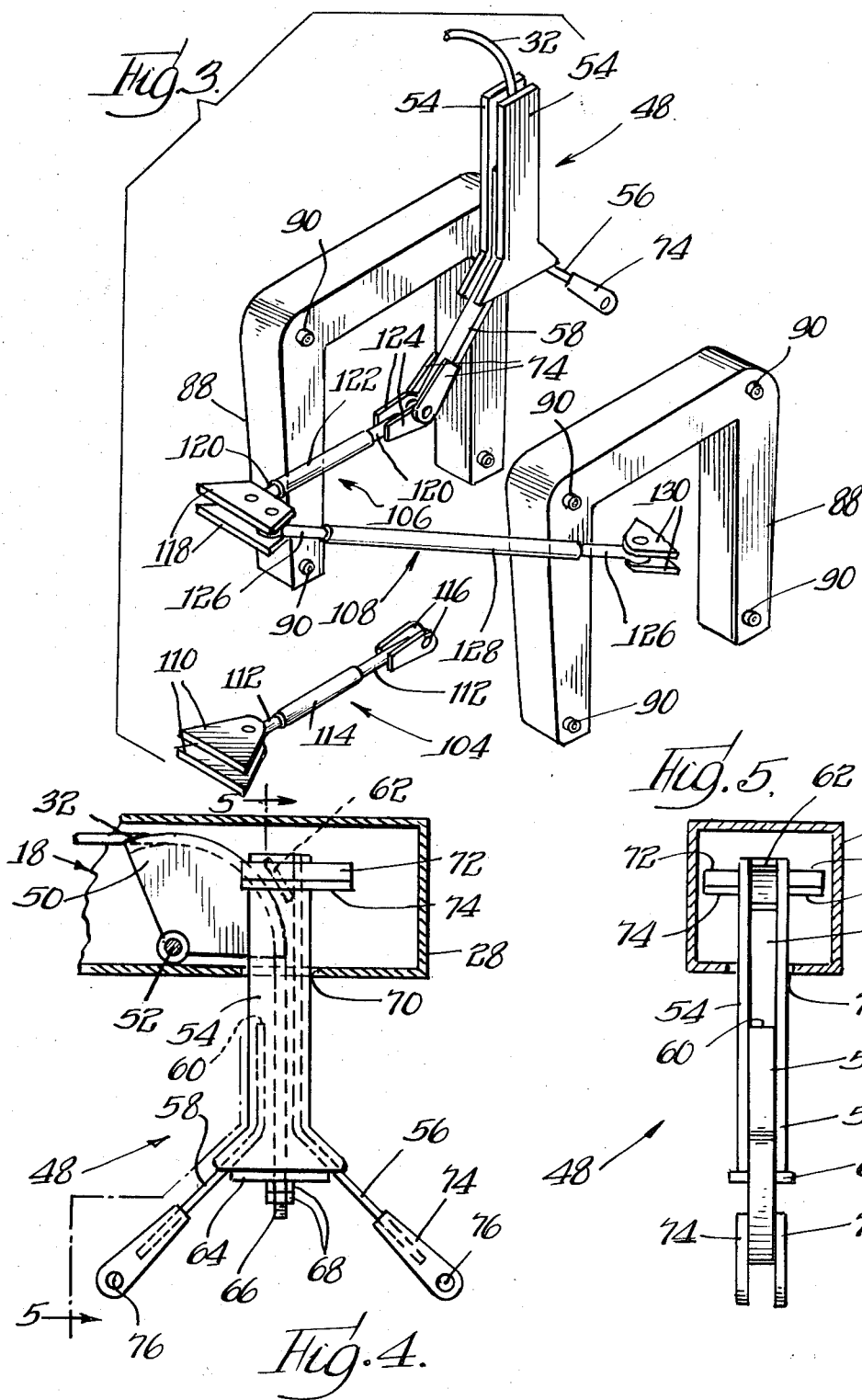

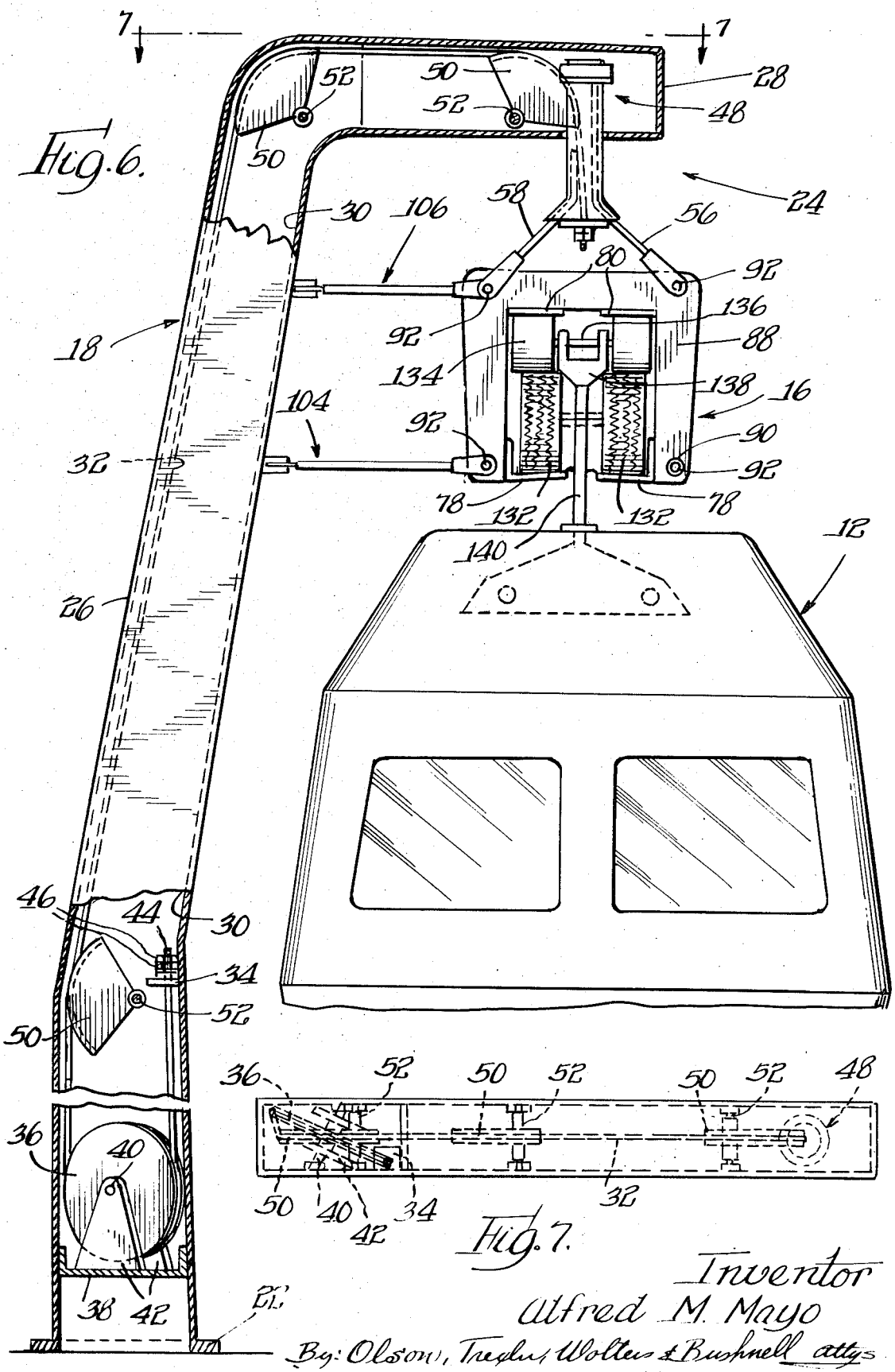

RAIL SUSPENSION ARRANGEMENT

This invention relates generally to overhead monorail transportation systems and more particularly to rail suspension arrangements for use in such systems.

In the past, rail suspension arrangements for overhead monorail transportation systems have characteristically exhibited relatively large bending deflection of the rail or beam during vehicle transit, as well as considerable stiffness in the mounting for the beam at each of the columns. Considerable difficulty has been experienced in providing a comfortable ride with such arrangements, especially at high cab speeds. For example, a comparatively uncomfortable ride is felt where the beam deflections are as little as one-tenth of an inch relative to a horizontal datum established by the cantilevered arms of the columns under live loading conditions during which the cab speed reaches 60 miles per hour. Softly sprung cab suspensions, such as are used in passenger automobiles, amplify these problems when the natural frequency of the suspension is approached by the rate of sequential deflection of the guideway beam.

Accordingly, an important object of the present invention is to provide a rail suspension arrangement for overhead monorail transportation systems which overcomes the difficulty of the prior art and contributes significantly to a comfortable ride.

A more general object of the present invention is to provide a new and improved overhead monorail guideway arrangement for transportation vehicles.

Yet another object of the present invention is to provide novel means for resiliently suspending an overhead transportation rail from a system of upright columns.

The present invention also contemplates provision of the resilient rail mounting by means of a cable spring. It has been found that this type of spring may be adapted to the present purposes and possesses a profound weight advantage over other types of springs. For example, for one specific suspension arrangement, a suitable cable spring weighed approximately thirty pounds whereas an equivalent leaf spring weighed approximately 60 pounds.

In order that the principles of the present invention may be readily understood, a single embodiment thereof, applied to a hollow beam type of guideway rail, but to which the application is not to be restricted, is shown in the accompanying drawings wherein:

FIG. 1 is an elevational view of an overhead monorail transportation system incorporating a rail suspension constructed in accordance with the present invention;

FIG. 2 is an enlarged perspective view showing details of construction of the overhead rail and the connections between the rail and the suspension arrangement;

FIG. 3 is a perspective view of that portion of the suspension arrangement which is connected to the overhead rail, together with certain related components of the rail and rail bracing;

FIG. 4 is a further enlarged elevational view, partially broken away to show the manner in which the hanger of the suspension is mounted in the cantilevered arm of an upright column;

FIG. 5 is an end elevational view taken substantially along the line 5—5 of FIG. 4;

FIG. 6 is an enlarged side elevational view of an upright column, the overhead rail, the suspension arrangement, and a portion of the cab vehicle; and FIG. 7 is a plan view taken substantially along the line 7—7 of FIG. 6.

Referring now in detail to the drawings, specifically to FIG. 1, a transportation system 10 includes a suitable number of cabs or vehicles 12 which are transportably supported by means of an overhead monorail guideway arrangement 14. The vehicles 12 are advantageously arranged to be lightweight, self-propelled units; and the guideway arrangement 14 comprises a suitable number of beam sections 16 which are arranged 600 to form a continuous rail. The guideway arrangement 14 additionally comprises a number of upright columns or towers 18 which are fastened to concrete piers 20 by means of base flanges 22. Alternatively, the columns 18 may be replaced by similar arrangements attached to existing structures.

The columns 18 are spaced apart along a transportation route at some suitable interval such as, for example, 60 feet; and in compliance with the features of the present invention, the monorail guideway arrangement 14 additionally comprises a suitable number of suspension units 24 which resiliently support the rail comprised of the beam sections 16 from the upright columns 18.

Turning to a consideration of FIGS. 6 and 7, the upright support column 18 is advantageously fabricated as a hollow, rectangular steel member including a generally upright, tubular portion 26 and an upper, generally laterally extending or cantilevered, tubular portion 28, portion 28 opening into portion 26 to form a continuous dogleg channel 30. As stated hereinabove, the present invention contemplates a resilient suspension of the beam section 16; and in the illustrated embodiment, the resilient suspension is accomplished by means including a cable spring 32 which is fabricated from braided strands of steel or a glass fiber reinforced resin composition, cable spring 32 being looped within the dogleg channel 30 in order that its length may be accommodated within a comparatively short tower.

More specifically, a cable mounting bracket 34 is welded or otherwise suitably secured to an interior wall of the upright tubular portion of the column 18 generally intermediate the ends thereof. Cooperatively, a cable pulley 36 is rotatably mounted to a platform 38 by means of a shaft 40 and laterally spaced, shaft support plates 42, platform 38 being welded or otherwise suitably secured to a pair of oppositely facing interior walls of the upright tubular portion 26 generally beneath the mounting bracket 34. In order to secure it in place, the cable 32 has a threaded shank 44 swaged onto its lower end, and this fitting is passed upwardly through a central aperture in the bracket 34 to receive a suitable number of locknuts 46. The cable is then threaded downwardly and over the pulley 36 and back up through the dogleg channel 30 to have a rail support hanger 48 fastened to its other end in a manner to be described more fully hereinafter. In addition, guide means are situated within the dogleg channel for properly positioning the cable spring; and these guide means specifically include a suitable number of sector plates 50 which are pivoted to the walls of column 18 by shafts 52.

Considering FIGS. 4 and 5 for a description of the construction of the hanger 48, that unit comprises a yoke member made up of a pair of spaced side plates 54 which are welded or otherwise suitably fastened to a pair of downwardly and outwardly diverging arms, outboard arm 56 and inboard arm 58. The inboard arm 58 is truncated at an end 60 in order to accommodate the adjacent sector plate 50. In addition, an angulated bumper plate 62 is attached between the plates 54 confronting the sector plate 50. In order to provide an attachment situs for the cable spring 32, the hanger 48 includes a horizontal bottom plate 64 which is suitably attached to the plates 54 between the lower, angulated portions of the arms 56 and 58. The cable 32 passes freely between the upper portions of the arms 56 and 58 and through a central aperture in the bottom plate 64. A threaded shank 66 is swaged to the end of the cable spring 32 and emerges beneath the bottom plate 64 to receive a pair of locknuts 68.

In compliance with the features of the present invention, the rail suspension arrangement is constructed to possess fail-safe characteristics. Accordingly, the upper portion of hanger 48 passes through a suitably shaped aperture 70 fashioned in the floor of the laterally extending column portion 28 to reside therein. A pair of stop bars 72 are rigidly secured to the outer, lateral faces of plates 54 overlying the floor of column portion 28. So positioned, the stop bars 72 are able to arrest downward movement of the hanger 48 and the attached rail upon excessive cable spring elongation or failure. Advantageously, a rubber cushion 74 is fastened to the undersurface of each stop bar 72 to absorb the shock of engagement with the floor of column portion 28.

The diverging portions of arms 56 and 58 are provided with respective pairs of connecting plates 74 at their lower ends, and each of the plates 74 is fashioned with a horizontal aperture 76 for use in attaching the adjacent beam sections 16 to the hanger 48.

The beam sections 16 comprise hollow structures in which the wheeled propulsion unit for vehicle 12 operates; and in order to provide planar horizontal surfaces for the wheels to roll on, each beam section includes spaced track plates 78, as shown in FIG. 2. These track plates extend the entire length of the beam section and are combined with other elements, such as a pair of top plates 80 and a plurality of side bars 82, to form a hollow, rectangular structure. Diagonal cross struts 84 are included to add strength to the structure, and a cover 86 may be added to envelop the top and sides for protecting the structural members and the vehicle propulsion unit from the weather.

Inverted U-shaped support collars 88 are fastened to the opposite ends of each beam section 16, and at each of its corners, the collar 88 is drilled and fitted with a horizontal bushing 90. Rod elements 92 are slidably disposed in the bushings 90 spanning the distance between the collars 88 of confronting beam sections in order to connect the beam sections and retain them against relative vertical and rotational dislocation. In addition, the upper rod elements serve as mounting sites for the respective connecting plates 74 of the hanger arms 56 and 58. Arranging the rod elements 92 to be in slidable engagement with the bushings 90 prevents the transfer of significant bending moments from one beam section to an adjacent beam section. As a result, minimal force is transmitted to adjacent columns when the vehicle 12 is centered at an intermediate column. This, in turn, promotes level transit for a vehicle traversing the rail defined by beam sections 16.

In order that adjacent beam sections may define a substantially uninterrupted guideway path for the wheeled propulsion unit while at the same time avoiding rigid interconnection thereof, the track plates 78 and the top plates 80 are advantageously provided with interengaging expansion joint elements. Specifically, the ends of track plates 78 and top plates 80 are provided with sets of laterally spaced fingers 94 and laterally spaced grooves 96 which are dimensioned to fit slidably into corresponding grooves and fingers in the track plates and top plates of the adjacent beam section. The amount of longitudinal displacement may be limited by one or more safety plates 98, one of which is suggested in broken outline. Each safety plate is provided with a circular hole 100 at one end for bolted or riveted attachment to the track plates 78 of one beam section, being additionally provided with an elongated slot 102 for bolted or riveted attachment to a track plate of the adjacent beam section. As will be appreciated, location of a bolt in the end of slot 102 which is nearest the hole 100 will limit longitudinal displacement of the adjacent beam sections by the length of the slot itself.

Lateral bracing is provided at each column 18 by means of a bottom center strut 104, a top center strut 106 and a top diagonal strut 108. With reference to FIG. 3, the bottom center strut 104 comprises a pair of bracket plates 110 for attachment to the column, a pair of eyebolts 112 which are rigidly joined by a tubular centerpiece 114, and a pair of apertured connecting plates 116 which slidably receive the proximate rod element 92, as is shown in FIG. 2. Returning to FIG. 3, the upper center strut 106 and the upper diagonal strut 108 are connected to the column by a pair of common bracket plates 118. The upper center strut 106 additionally includes a pair of eyebolts 120 which are rigidly interconnected by a tubular centerpiece 122, the outboard eyebolt 120 being secured to a pair of apertured connecting plates 124 which slidably receive the proximate upper rod element 92. Similarly, the diagonal strut 108 is made up of a pair of eyebolts 126 which are fastened rigidly together by a tubular centerpiece 128, the outboard eyebolt 126 being attached to the beam section structure by a pair of bracket plates 130.

Returning to FIG. 6, the propulsion unit for the vehicle 12 includes a pair of lower, tired wheels 132 which ride on the track plates 78, the propulsion unit additionally including a pair of upper, guide wheels 134 which are arranged for engagement with the top plates 80. The wheels 134 are joined by an axle 136 which may also carry a yoke 138 from which the vehicle 12 is suspended by means including a post 140.

As has been described hereinabove, resilient mounting of the beam sections 16 to the columns 18 minimizes differential vertical deflection of the rail under live loading so as to provide substantially level transit to the vehicle 12. In order to promote this desirable characteristic, each beam section 16 is provided with a shallow convex curvature in the longitudinal direction, as is suggested in FIG. 1 by an exaggerated deviation from the broken horizontal line 142. The deflection of the guideway beam section due to its own weight is compensated for by means of this jig camber in the unloaded and unsuspended condition. Thus, the only significant vertical deflection of the beam section is a result of live loading consequent to vehicle travel. The cable spring 32 is advantageously designed to elongate twice the maximum mid-beam deflection $x$ when the vehicle 12 is suspended directly at a column 18. Accordingly, when the vehicle is located at the point midway between adjacent columns, the weight of the vehicle is distributed equally between the adjacent columns, and the cable spring elongation is equal to the deflection $x$. So arranged, a guideway system exhibits substantially constant total deflection whether the live load is directly under a column, at the mid-span of the beam, or at an intermediate position. Furthermore, the total deflection within the elastic limits of the various members does not vary significantly with the position of the live load along the beam span even when different values of live load are applied.

In accordance with another feature of the invention, the columns 18 are filled with sand or other dry, particulate material 144 in order to provide vibration damping in the system.

As will be appreciated from the foregoing description, the instant invention presents an overhead monorail guideway arrangement which affords a substantially level transit to the transported vehicle. This level ride ensures a high degree of comfort to vehicle passengers and is particularly advantageous on high speed sections of the route where vehicle speeds may exceed 25 feet per second and may reach 100 feet per second.

The specific embodiment herein shown and described is to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. An overhead monorail guideway arrangement for transportation vehicles comprising: a plurality of substantially upright columns arranged in spaced apart relationship along a transportation route; overhead rail means tracing said route; and suspension means resiliently mounting said rail means to said columns whereby to minimize differential vertical deflection of the rail means under live loading in order to provide substantially level transit to a vehicle riding on said rail means, each of said columns comprising a generally upright portion and a generally laterally extending portion joined to the upper end of said upright portion, said suspension including individual spring means mounted at each laterally extending portion and connected between said rail means and the corresponding column in extensible and contractible relationship for vertically suspending said rail means vertically beneath a laterally extending portion of said column whereby maximum load is applied to the spring means when a vehicle is suspended beneath a laterally extending portion of a column, said individual spring means being arranged to elongate an amount equal to about twice the maximum mid-beam deflection of said rail means when said vehicle is suspended directly at the corresponding column and to elongate about one-half of said amount when said vehicle is located at a point mid-way between adjacent columns.

2. A guideway arrangement according to claim 1 wherein said suspension means includes cable spring means.

3. A guideway arrangement according to claim 1 wherein said suspension means includes fail-safe abutment means.

4. A guideway arrangement according to claim 1 wherein said upright portion and said laterally extending portion are tubular and opening into each other to form a continuous dogleg channel; wherein said suspension arrangement further comprises mounting bracket means medially secured to an interior wall of each of said upright tubular portions, pulley means rotatably mounted to each of said upright tubular portions interiorly thereof and spaced beneath said mounting bracket means, and a plurality of guide means disposed in each of said channels; and wherein said spring means includes a cable spring secured to said mounting bracket means, threaded over said pulley means and said guide means and connected to said rail means.

5. A guideway arrangement according to claim 4 wherein each of said guide means includes a centrally pivoted sector plate.

6. A guideway arrangement according to claim 1 wherein said rail means includes adjacent beam sections having support members adjacent the confronting ends thereof, said support members being connected by horizontally disposed rod elements slidably engaging said support members; and wherein said suspension means includes a yoke member having a pair of spaced arms having apertures horizontally, slidably receiving said rod elements, whereby to prevent transfer of significant bending moments from one beam section to an adjacent beam section.

7. A guideway arrangement according to claim 6 wherein said rail means further includes slidably interengaging expansion joint elements connecting adjacent beam sections into a substantially uninterrupted guideway path.

* * * * *

UNITED STATES PATENT OFFICE
CERTIFICATE OF CORRECTION

Patent No. 3,690,266　　　　　　Dated September 12, 1972

Inventor(s) Alfred M. Mayo

It is certified that error appears in the above-identified patent and that said Letters Patent are hereby corrected as shown below:

Column 1, line 45, change "60 pounds" to --600 pounds--;

Column 2, line 13, change "600" to --end-to-end--.

Signed and sealed this 22nd day of May 1973.

(SEAL)
Attest:

EDWARD M. FLETCHER, JR.　　　　　ROBERT GOTTSCHALK
Attesting Officer　　　　　　　　Commissioner of Patents